ELECTRICAL CONTROL CIRCUITS

Filed June 25, 1959 2 Sheets-Sheet 1

INVENTOR
U. F. GIANOLA

BY William H. Kamstra
ATTORNEY

INVENTOR
U. F. GIANOLA
BY William H. Kamstra
ATTORNEY

United States Patent Office 3,045,215

Patented July 17, 1962

3,045,215

ELECTRICAL CONTROL CIRCUITS

Umberto F. Gianola, Florham Park, N.J., assignor to Bell Telephone Laboratories, Incorporated, New York, N.Y., a corporation of New York Filed June 25, 1959, Ser. No. 822,907
13 Claims. (Cl. 340—174)

This invention relates to electrical shift register circuits and particularly to such circuits in which magnetic core means are employed as information bit storage elements.

Electrical shift registers, or delay lines as they are also frequently termed, are well known in the information handling art. An information bit may be introduced at one end of such circuits in the form of a current pulse. The bit is then shifted through successive stages of the register under the control of sequentially applied advance current pulses during advance phases of operation. At the output terminus of the register the information bit is made available to subsequent circuitry of the system of which the register may comprise a part, or the bit may be reintroduced into the input end of the register and the shift operation of the particular bit repeated. Between each advance phase an information bit must be temporarily stored and, for this purpose, toroidal magnetic cores displaying substantially rectangular hysteresis characteristics have been found well suited. Shift registers employing conventional toroidal cores as information storage elements have found extensive application, and particular problems incident to their use have been widely discussed and treated in the literature.

One of these problems is the requirement that a unidirectional current element be provided between each of the adjacent cores of the register. In a conventional magnetic core shift register each core is coupled to its succeeding core by means of a closed coupling loop. When an information bit, say a binary "1," is shifted from one core to another, the transferor core is caused to switch from one remanent magnetic state to another to induce a shift current pulse in the coupled loop in the forward direction. The shift current so induced is then effective to switch the remanent magnetization of the succeeding core to the state representative of the shifted information bit. However, the switching of the transferor core is also effective to induce a flux switching current in the loop coupling it to the preceding core. The resulting shift of information in the backward direction must accordingly be prevented and in the usual case this is accomplished by inserting a diode in each of the coupling loops to permit the conduction of effective shift current in only a forward direction. This use of blocking diodes has proved satisfactory from the simple viewpoint of preventing an undesired current flow. However, from other points of view, the necessity of employing unilateral diode elements has resulted in less than optimum circuit operation. Thus, the advantage of extreme reliability afforded by the magnetic core elements is frequently offset by a lesser performance of the diodes employed. Further, the high forward resistance of the diodes contributes substantially to power losses occurring during the transfer of an information bit from one core to another. As a consequence of these and other considerations, a number of attempts have been made in the art to obviate the necessity for diodes in magnetic shift registers.

Conventional toroidal cores, due to the single aperture, which may be extremely small, also frequently present wiring problems in the fabrication of circuits in which they are employed. Thus, in one well-known form of magnetic core shift register, an input winding, an advance winding, and sometimes two output windings must be wound in varying numbers of turns through a single small aperture. The complexity thus introduced tends to add materially to the cost of the register as a whole.

Accordingly, it is an object of the present invention to provide a new and improved information shift register circuit.

It is another object of this invention to accomplish the shift of information between storage elements of a magnetic shift register without the use of intervening diodes.

Still a further object of this invention is to provide a more reliable magnetic shift register circuit which requires a low power expenditure in its operation and is more readily fabricated than many known registers accomplishing the same end function.

The foregoing and other objects of this invention are realized in one specific illustrative embodiment thereof which employs as a basic information bit storage element a magnetic flux control structure in which an induced flux distribution may be variously controlled. Flux patterns are rearranged in accordance with operative stages in the shift of information from storage element to storage element. Each of the individual storage element structures has two apertures which divide the structure into three separate and distinct flux paths. Connecting each end of the legs of the structure defining the three paths are a pair of side-rails for completing any flux present in the legs. To provide a permanence of information storage the magnetic core structure is formed of a magnetic material having substantially rectangular hysteresis characteristics. Each of the paths defined by portions of the structure are flux-limited in proportion to the flux control required in each of the legs. Thus, assuming a basic unit of flux with which control may be achieved, an input leg of the structure is dimensioned to have a maximum flux capacity of two such units of flux. Each of the connecting side-rails also has a minimum cross-sectional area such as to have a capacity of at least two such flux units. Each of the remaining two legs is dimensioned to have a maximum flux capacity of a single such unit. With the foregoing dimensions, it is apparent that a saturation flux induced in the two-unit input leg in one direction may be separately completed via the side-rails through each of the single unit legs in the opposite direction.

According to one feature of this invention, three distinct patterns of flux distribution are assigned to carry out a complete information shift. A "clear" pattern accords with the completion of a saturation flux in the input leg described in the immediately foregoing. A binary "1" information bit is represented by a closed flux in the loop defined by the two single-unit legs, and a "primed" pattern is represented by a reversal of the "1" flux in the loop defined by the two single-unit legs. A binary "0" pattern is identical to the "clear" flux pattern. The foregoing flux patterns are contained in a series of storage elements arranged in a two-core-per-bit shift register configuration in a manner such that between any given advance phase every alternate storage element will be in a "clear" magnetic flux state.

It is another feature of this invention that energizing windings coupled to the flux control legs of a storage element are interconnected in a four-phase advance circuit network. Thus, in one complete shift cycle an information bit is shifted from one two-core stage of the register to the succeeding two-core stage. In this case each stage is understood to comprise a storage element containing an information bit and its forward adjoining storage element which is then in a "clear" magnetic flux state.

Still another feature of this invention resides in the simple coupling loop for connecting each of the storage elements to its preceding and succeeding storage elements. Thus, in accordance with the principles of this invention, a coupling loop advantageously having only its own inherent resistance and no diodes is made possible. Although a current may still be induced in a back coupling loop by the switching of a transferor storage element, the flux pattern in the preceding element at this time will be such that the effect of the back current on the output leg of the latter element is inhibited. The flux distribution pattern of the preceding element is accordingly undisturbed.

According to still another feature of this invention, bias windings may be added to flux switching legs of the storage elements to reduce the current required in a coupling loop to effect flux switching in a succeeding storage element. The bias windings are energized concurrently with the windings of an advance phase to bias the input legs of the storage elements to their switching thresholds. Only a relatively low current value in a coupling, and, as a result, in an advance phase, will be sufficient to accomplish the transfer of an information bit.

This invention together with the foregoing and other objects and features thereof will be better understood from a consideration of the detailed description of an illustrative embodiment thereof which follows when taken in conjunction with the accompanying drawing, in which.

Figures 1, 3:
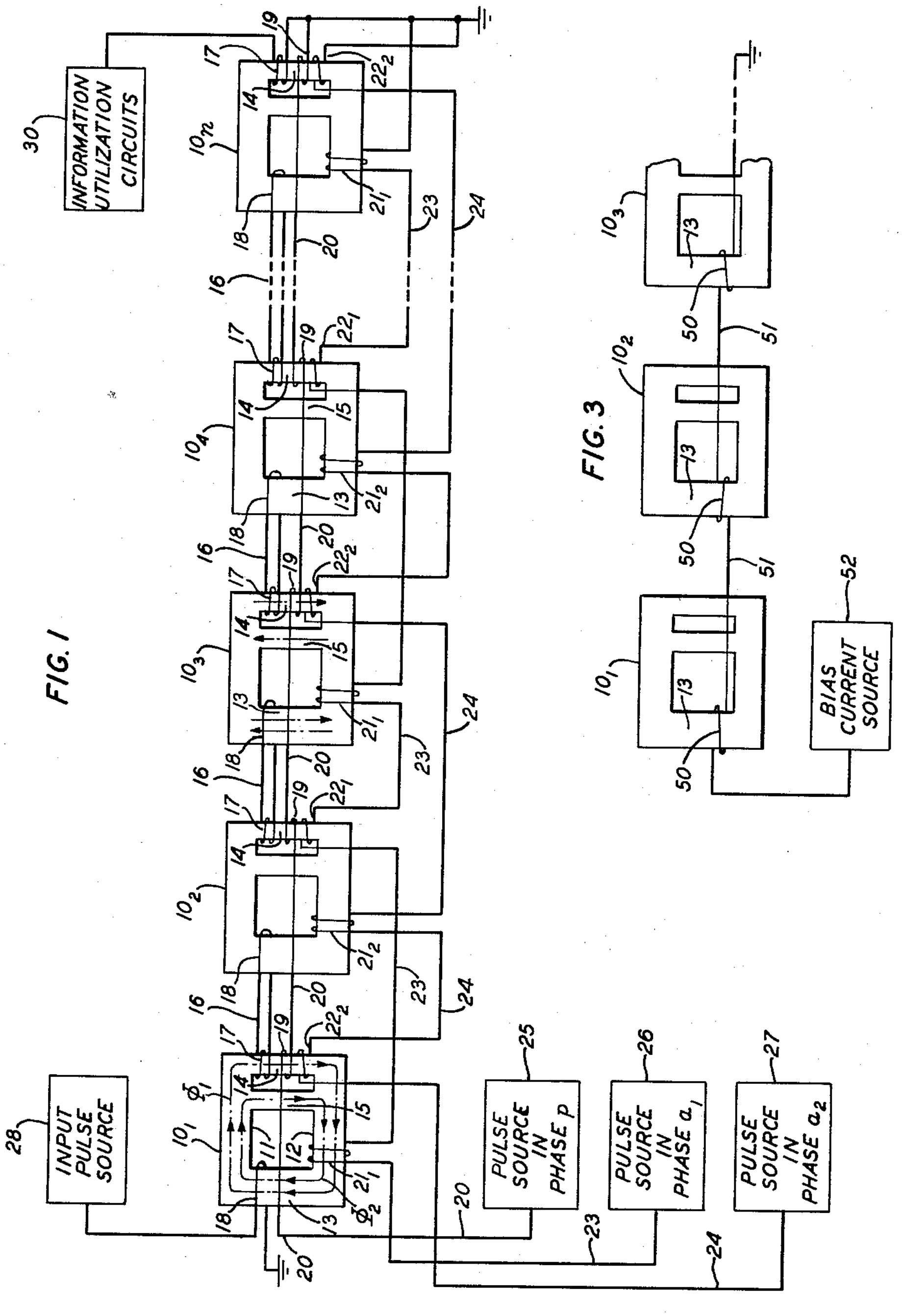
FIG. 1 is a schematic diagram of a specific magnetic shift register according to this invention.
FIG. 3 is a partial schematic diagram of a modification of the shift register circuit of FIG. 1 showing only an added bias winding.

The shift register circuit depicted in FIG. 1 comprises a plurality of magnetic core structures 10 each of which serves as a storage point for an information bit during its transit of the register. The core structures 10 which are all identical, may be described with particular reference to the structure $\mathbf{10_1}$. Each of the core structures 10 is formed to have two apertures, one large and one small, for purposes which will appear hereinafter. A pair of side rails 11 and 12 is thus defined to serve as flux connecting bridges between an input leg 13, an output leg 14, and an intermediate leg 15, which legs and side-rails are all combined in a single integral structure. The core structures 10 are fabricated of any well-known magnetic material exhibiting substantially rectangular hysteresis characteristics and are each dimensioned to present flux-limited flux paths through the various legs and side-rails. Thus, the input leg 13 is dimensioned in minimum cross-sectional area to be substantially equal to the sum of the minmum cross-sectional areas of the legs 14 and 15. No specific dimensional limitations exist for the cross-sectional areas of the side-rails 11 and 12 except that they be of sufficient flux capacity to complete any flux induced in the legs 13, 14, and 15. With the foregoing flux paths available, if each of the legs 14 and 15 is understood to have a flux capacity of $\phi$ units, each of the side-rails 11 and 12 and the input leg 13 then has a flux capacity of at least $2\phi$ units. Flux closure in the available paths in these terms is shown in the core structure $\mathbf{10_1}$ by the broken lines $\phi_1$ and $\phi_2$. The flux directions indicated by the arrows in the structure $\mathbf{10_1}$ are those representative of a particular operative magnetic state of the register to be described.

Each of the core structures 10 is coupled to a preceding structure and a succeeding structure by a coupling loop 16. Each loop 16 serially connects an output winding 17 inductively coupled to an output leg 14 of one core structure 10 and an input winding 18 inductively coupled to an input leg 13 of an adjacent succeeding core structure 10. The loops 16 advantageously contain no other electrical elements and only the properties inherent in the wiring of a loop, such as its internal resistance, will have any effect on current in the loop. The ratio of the turns of the windings 17 and 18 may be suitably determined in accordance with considerations of back magnetomotive forces developed during switching, loop resistance, and the like, to be described. A priming winding 19 is inductively coupled to each of the output legs 14 of the structures 10 and the windings 19 are serially connected in a priming circuit 20. Each of the core structures 10 is also provided with a pair of advance windings 21 and 22 inductively coupled to the side-rail 12 and output leg 14, respectively. The advance windings 21 of first alternate core structures 10 are serially connected in a first advance circuit 23 to the advance windings 22 of adjacent alternate core structures 10. Thus, the first advance circuit 23 includes in series the advance windings $\mathbf{21_1}$ of each of the core structures $\mathbf{10_1}$, $\mathbf{10_3}$, . . . and $\mathbf{10_n}$ and the advance windings $\mathbf{22_1}$ of each of the core structures $\mathbf{10_2}$ and $\mathbf{10_4}$. The advance windings 21 of the above-mentioned adjacent alternate core structures 10 are serially connected in a second advance circuit 24 to the advance windings 22 of the above-mentioned first alternate core structures 10. Thus, in a manner similar to that described for the first advance circuit 23, the second advance circuit 24 includes in series the advance windings $\mathbf{21_2}$ of each of the core structures $\mathbf{10_2}$ and $\mathbf{10_4}$ and the advance windings $\mathbf{22_2}$ of each of the core structures $\mathbf{10_1}$, $\mathbf{10_3}$, . . . and $\mathbf{10_n}$.

The priming circuit 20 and the advance circuits 23 and 24 are each connected at one end to ground. The priming circuit 20 is connected at its other end to a source of current pulses 25 which is activated in a prime phase $p$. The first advance circuit 23 is connected at its other end to a source of current pulses 26 which is activated in a first advance phase $a_1$. The second advance circuit 24 is connected at its other end to a source of current pulses 27 which is activated in a second advance phase $a_2$. The pulse sources 25, 26, and 27 may each comprise any of the well-known signal generators devisable by one skilled in the art which are capable of producing current pulses of the character, and controllable in the manner, to be described hereinafter. The input winding 18 of the first core structure $\mathbf{10_1}$ of the shift register of FIG. 1 is connected between ground and a source of input information 28. The latter circuit is also of a character well known in the art and also need be described herein only to the extent of its control and output. The output winding 17 of the last core structure $\mathbf{10_n}$ of the register of FIG. 1 is connected between ground and information utilization circuits 30. The latter circuits may comprise subsequent stages of the system in which the register of FIG. 1 is adaptable. As such, for example, the circuits 30 may comprise, together with the source 28, a re-entrance arrangement by means of which the information which is spilled out of the last core structure $\mathbf{10_n}$ is introduced back into the register at the core structure $\mathbf{10_1}$.

With the foregoing organization of the illustrative embodiment of FIG. 1, a complete shift cycle of operation may now be described with particular reference to the flux pattern chart of FIG. 2. A complete shift cycle will be effective to transfer a particular bit of information from one of the two-core structure stages of the shift register of FIG. 1 to an adjacent stage. Each stage is to be understood as comprising the core structure 10 containing an information bit and its forward adjacent core structure 10 which is in a "clear" flux state. For present purposes it will be assumed that as a result of previous shift cycles of operation a binary "0" is contained in each of the core structures $\mathbf{10_1}$ and $\mathbf{10_n}$ and a binary "1" is contained in the core structure $\mathbf{10_3}$. In the present case, the latter storage elements accordingly are the information elements, each of the remaining elements $\mathbf{10_2}$ and $\mathbf{10_4}$ assuming the role of transfer elements and being in a "clear" flux state. The above initial alignment of stored information is shown in row I of FIG. 2 in terms of the flux directions in the legs of the structures 10. It may be noted that the arrows are spaced in accordance with the spacing of the legs in each structure 10 and the flux units represented thereby may be closed to present the $\Phi_1$ and $\Phi_2$ flux loops depicted in core structure $\mathbf{10}_1$ of FIG. 1. The arrows of FIG. 2 will be undesignated except where specifically referred to. The core structures 10 which are in a "clear" flux state have no information stored therein, however, in accordance with standard practice in representing binary values, the same flux distribution pattern may be assigned to represent a binary "0" and inspection of the table of FIG. 2 indicates that this representation has been carried out.

Figure 2:
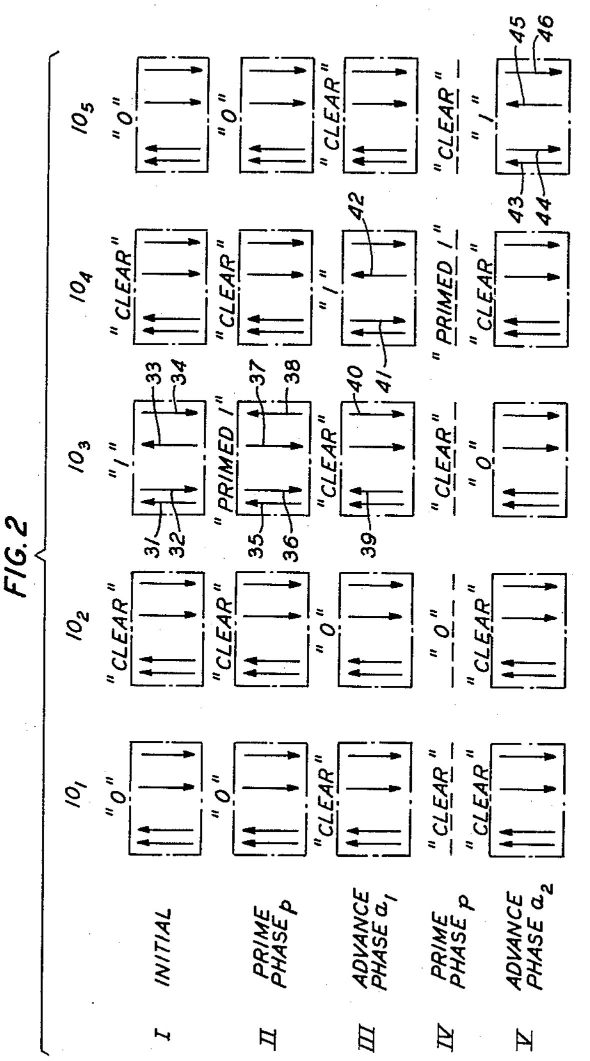
FIG. 2 is a flux distribution table showing various flux patterns at different operative stages of the shift register of FIG. 1.

A binary "1" is represented in a storage element as depicted in the core structure $\mathbf{10}_3$ of FIG. 2 in a flux pattern in which the input leg 13 is substantially magnetically neutral and a flux loop is closed through the output leg 14 and intermediate leg 15. The neutral magnetic state of the input leg 13 of core structure $\mathbf{10}_3$ may be conveniently thought of as one in which one flux unit $\Phi$ is in one direction in the leg 13 and the other flux unit $\Phi$ is in the opposite direction in the same leg. The latter units are dsignated by the arrows 31 and 32 in FIG. 2. Significant portions of the closed flux loop in the legs 14 and 15 of the core structure $\mathbf{10}_3$ representative of the binary "1" stored therein are designated by an upward arrow 33 and a downward arrow 34 as viewed in the respective legs understood as containing the flux portions in FIG. 2.

Assuming an initial information alignment in the register such as described above and symbolized in row I of FIG. 2, the register is now prepared for the first operative phase of a shift cycle. The first phase is a "prime" phase *p* in which a positive current pulse is applied from the source 25 to the priming circuit 20 and thereby the priming windings 19. The sense of the windings 19 and the polarity of the applied current pulse are such that a magnetomotive force is developed tending to switch the flux in each of the coupled output legs 14 of the core structures $\mathbf{10}_1$ through $\mathbf{10}_n$. As indicated in row I of FIG. 2, each of the latter output legs has a remanent flux therein of a polarity represented as downward as viewed in FIG. 2. Each of these legs is accordingly in a flux state which is of a polarity to be switched by the magnetomotive forces developed by the applied priming pulse. The latter pulse, however, is of an amplitude such as to deliver only a limited drive magnetomotive force. This force is limited so that, although it is sufficient to switch the direction of a remanent flux between the legs 14 and 15 of a core structure 10, it cannot accomplish a flux reversal around the longer path defined by the legs 13 and 14. The latter flux redistribution would be necessary to effect any flux changes at all in each of the core structures $\mathbf{10}_1$, $\mathbf{10}_2$, $\mathbf{10}_4$, . . . and $\mathbf{10}_n$. This may be determined from an inspection of the paterns depicted in FIG. 2, bearing in mind the flux limited restrictions imposed on the available flux paths of a structure 10. In the present magnetic state of core structure $\mathbf{10}_3$, however, such an inspection will show that a path is available through the adjacent leg 15 for a complete flux reversal in the output leg 14. Accordingly, the remanent flux in the latter output leg is reversed in direction, the switching flux closing through the adjacent leg 15. Each of the adjacent cleared storage elements will remain magnetically unaffected as will be the information elements containing binary "0's" as a result of the above-mentioned priming pulse limitation. Should any of the remaining storage elements have contained binary "1's", a similar "priming" would have occurred as a result of the applied priming current pulse in the prime phase *p*. In order to promote the foregoing preferential flux switching and such switching to be described, the aperture separating the input leg 13 and the intermediate leg 15 is made larger than the adjoining aperture separating the latter leg and the output leg 14. In this manner, paths of different magnetic reluctance are offered to a switching flux at various operative stages of the register.

During the priming phase *p*, since no flux change occurs in the input leg 13 of the core structure $\mathbf{10}_3$, no current is induced in the coupling loop 16 coupling the latter element to the preceding core structure $\mathbf{10}_2$. However, as the flux in the output leg 14 of the structure $\mathbf{10}_3$ is switched, a current will be induced in the coupling loop 16 coupling the latter element to the succeeding core structure $\mathbf{10}_4$. This induced current, however, will be in a direction merely to drive the flux in the input leg 13 of the latter element further into saturation without changing its direction. The "clear" flux pattern of the core structure $\mathbf{10}_4$ will, as a result, be left undisturbed during any priming operation. The flux patterns of the core structures 10 of the register of FIG. 1 after the completion of the first prime phase *p* are shown in row II of the table of FIG. 2. The "primed 1" flux pattern is shown by the arrows 35 through 38.

It may be observed at this point that the current induced in the forward coupling loop 16 mentioned above is limited only by the wiring resistance of the loop. This current acts counter to the applied priming drive pulse with respect to the switching magnetomotive force acting on the output leg 14 of the core structure $\mathbf{10}_3$. As a result, the latter leg tends to switch slowly during the prime phase and a complete reversal can take place only if the priming drive pulse is applied for a sufficient length of time. However, advantageously it is not necessary for the operation of a register according to this invention that a complete flux reversal occur in the output leg 14 during the prime phase. Any flux that is "lost" in this manner can readily be compensated for. The gain provided by the turns ratio of the output windings 17 and input windings 18 of the coupling loops may readily accomplish this compensation during the following advance phase $a_1$ which may now be described.

In the second phase of the shift cycle, the advance phase $a_1$, a positive current pulse is applied from the source 26 to the first advance circuit 23 and thereby the included advance windings $\mathbf{21}_1$ and $\mathbf{22}_1$ of the coupled alternating core structures 10. As a result, each of the information containing core structures 10 will be cleared and the stored information shifted to the next adjacent storage elements. The latter elements, it will be recalled, were up to this point in a "clear" magnetic flux state. By providing two advance windings, 21 and 22, to different portions of a core structure 10 during an advance phase $a_1$ or $a_2$, two separate and distinct functions are simultaneously accomplished. One core structure 10 is restored to a "clear" state and a core structure 10 to which a binary "1" may be shifted is prevented from assuming any flux pattern other than the one selected to represent this value. This, specifically in the core structure $\mathbf{10}_1$ containing a binary "0," the sense of the advance winding $\mathbf{21}_1$ and the polarity of the applied $a_1$ advance pulse are such as to drive the flux in the side-rail 12 in the direction indicated in FIG. 1 and in the row III of the chart of FIG. 2. Thus, since the core structure $\mathbf{10}_1$ initially contained a binary "0," no flux change occurs nor needs to occur to establish therein a "clear" state, the side-rail 12 merely being driven further into saturation from its remanent point on its hysteresis loop. As the $a_1$ advance pulse is also applied to the advance winding $\mathbf{22}_1$ of the core structure $\mathbf{10}_2$, a magnetomotive force is again developed, due to the sense of the winding $\mathbf{22}_1$, such as to drive the flux in the coupled output leg 14 in the direction which already obtains therein. Since both of the core structures $\mathbf{10}_1$ and $\mathbf{10}_2$ so far mentioned were already in "0" or a "clear" state, no essential flux change has occurred and no switching current has been developed, as a result, in the coupling loops 16 connected to either element.

When the $a_1$ advance pulse is applied via the circuit 23 to the advance winding $\mathbf{21}_1$ of the core structure $\mathbf{10}_3$, however, the magnetomotive force developed causes a flux reversal of one flux unit Φ. This core structure presently contains a "primed 1" and accordingly one flux unit Φ in the input leg 13 was closed through the output leg 14 in a direction opposite to that in which the $a_1$ advance pulse tends to drive it. A flux reversal accordingly takes place in the output leg 14 as the core structure $\mathbf{10}_3$ is cleared by the $a_1$ advance pulse, leaving the flux pattern in the latter element in the directions indicated in row III of FIG. 2. The flux reversal in the output leg 14 of core structure $\mathbf{10}_3$ induces a current in the coupling loop 16 coupled to the succeeding core structure $\mathbf{10}_4$. The latter current is of a polarity such that, in view of the sense of the windings 17 and 18 of the conducting loop 16, a magnetomotive force is applied to the input leg 13 of the core structure $\mathbf{10}_4$ in a direction opposite to that of the flux patterns representing the present "clear" state of the element $\mathbf{10}_4$. As a result, the remanent flux in the input leg 13 of the latter core structure begins to switch.

However, at this same time, the $a_1$ advance current pulse is also being applied to the advance winding $\mathbf{22}_1$ coupled to the output leg 14 of the core strurcture $\mathbf{10}_4$. The sense of the latter advance winding is such that the magnetomotive force applied drives the flux in the latter output leg 14 further into saturation in the same direction and accordingly positively prevents any switching flux closure through this path. Only a single switching flux unit Φ can accordingly find a closure path in the core structure $\mathbf{10}_4$ and that through its intermediate leg 15. With respect to the core structure $\mathbf{10}_3$ and $\mathbf{10}_4$, the application of the $a_1$ advance pulse accordingly produces the flux changes described above and shown in row III of FIG. 2. Thus in the input leg 13 of core structure $\mathbf{10}_3$, a flux reversal represented by the arrow 39 occurred and in the output leg 14 of the same element, a flux reversal represented by the arrow 40 occurred. In the input leg 13 of the core structure $\mathbf{10}_4$, a flux reversal represented by the arrow 41 took place and in the intermediate leg 15 of the same element, a flux reversal represented by the arrow 42 took place. The flux pattern of the core structure $\mathbf{10}_3$, after the application of the $a_1$ advance pulse, is restored to a "clear" state and the binary "1," initially in the latter core structure, is shifted to the next succeeding storage element $\mathbf{10}_4$.

The reversal of the flux unit Φ represented by the arrow 36 of row II of FIG. 2 to the direction represented by the arrow 39 of row III during the $a_1$ advance phase, as would be expected, induced a current in the coupling loop 16 back coupling the core structure $\mathbf{10}_3$ to the preceding core structure $\mathbf{10}_2$. This current is of a polarity and the winding 17 of the latter coupling loop 16 is in a sense such as to tend to switch the flux in the output leg 14 of the core structure $\mathbf{10}_2$ and thus disturb its required "0" state. However, it will be recalled that the $a_1$ advance pulse being applied at this time to the advance winding $\mathbf{22}_1$ of the output legs 14 of both the preceding and succeeding core structures of the core structure from which an information bit is being shifted, advantageously prevents such undesired flux reversals. The application of the $a_1$ advance pulse to the advance winding $\mathbf{21}_1$ of the core structure $\mathbf{10}_n$ will have the same effect on that element as that described above for the effect of the $a_1$ advance phase on the core structure $\mathbf{10}_1$. Since the flux patterns representing a "clear" and a "0" state are the same in the illustrative embodiment of FIG. 1, the net effect on the two operative states is also the same. As a result of the foregoing operation, each of the "1" and "0" information bits has been shifted one core structure to the right as viewed in FIG. 1. This new alignment of information and cleared storage elements may be clearly seen in row III of FIG. 2.

The shifted "1" information bit at ths point still remains in the two-core per bit stage of the register in which it was located at the beginning of the present shift cycle. Thus, one additional shift is required to transfer the bit to the next succeeding stage. The extent of a "stage" of the register of FIG. 1 is thus directly related to the number of phases of the shift cycle. The next phase is again a priming phase $p$ during which phase the pulse source 25 is again energized to apply a positive priming pulse to the priming circuit 20. Since the redistribution of the flux pattern in the affected cores during this phase is identical to that described for the initial priming phase, it need not be repeated at this point. It need only be said that the "1" pattern presently in the core structure $\mathbf{10}_4$ will be redistributed into the "primed 1" pattern as was described hereinbefore in this shift cycle. This "primed 1" pattern is clearly depicted by the representative arrows 35 through 38 in row II of FIG. 2. Thus, only the core structures 10 having contained therein a binary "1" will be magnetically affected during this priming phase, the remaining "0" and "clear" structures remaining undisturbed. The second priming phase $p$ is abbreviated in row IV of FIG. 2 without being specifically repeated in symbolic form. Although the source 25 has been described as a source of pulses in phase $p$ interleaving the pulses in phases $a_1$ and $a_2$, the source 25 may alternatively comprise one which supplies a constant current priming signal. The priming current is then present at all times, but is ineffective during phases $a_1$ and $a_2$ because the associated pulse sources 26 and 27 produce dominant magnetomotive drives in the cores. In such an alternative arrangement, which will be apparent to one skilled in the art, some economy may be realized since control clock pulses need be provided by external circuitry, not shown in the drawing, for only two phases.

The core structure $\mathbf{10}_4$ is now in the primed magnetic state and the register is prepared for the application of the second advance phase $a_2$. During the latter phase, a positive advance current pulse supplied by the source 27 is applied to the second advance circuit 24 and thereby to the advance windings $\mathbf{21}_2$ and $\mathbf{22}_2$ of the coupled alternate cores. The effects of the magnetomotive forces developed by the advance windings $\mathbf{21}_2$ and $\mathbf{22}_2$ on the flux in the coupled legs is essentially similar to those discussed above in connection with the operative effects of the advance pulse in phase $a_1$ on the windings $\mathbf{21}_1$ and $\mathbf{22}_1$. The binary "1," previously in its "primed" form in the core structure $\mathbf{10}_4$, is, as a result of the applied $a_2$ advance pulse, shifted to the succeeding core structure $\mathbf{10}_5$. The latter core structure is not explicitly shown in FIG. 1 but is symbolized in the table of FIG. 2. The resulting alignment of information and clear flux patterns is depicted in row V of FIG. 2, the binary "1," now in core structure $\mathbf{10}_5$ being indicated by the arrows 43 through 46. Each of the information bits 0, 1, and 0, initially in the register of FIG. 1, is shown to have been shifted one "stage" to the right as viewed in FIG. 1. The "0" originally in core structure $\mathbf{10}_n$ is shifted out during the time of the second advance phase $a_2$. This particular information appears as the absence of a signal, or at most a negligible noise signal, on the output winding 17 of the output leg 14 of core structure $\mathbf{10}_n$ in the conventional core read-out manner for representing binary "0" values. This output condition representing a binary "0" is transmitted to the information utilization circuits 30.

In the foregoing description it was asusmed that no new information bit was introduced into the shift register during the shift cycle. Accordingly, when the binary "0" initially in the core structure $\mathbf{10}_1$ was shifted to the core structure $\mathbf{10}_3$, the former element was left in a "clear" state. During the $a_2$ advance phase, while the output leg 14 of the core structure $\mathbf{10}_1$ is being held saturated in the direction indicated in FIG. 1, a positive input pulse may be applied from the input source 28 to the input winding 18 of the input leg 13. Such a signal, representative of a binary "1," would cause a flux reversal of a single flux unit Φ in the latter leg and the flux in the output leg 14, which remains unchanged in direction, would be closed by switching the flux in the intermediate leg 15. The resulting flux pattern would be that corresponding to a binary "1." The introduction into the register of a binary "0" would, of course, result in no change from the flux pattern representing a "clear" state. A complete shift cycle has thus been described and further such cycles and operations attendant thereto are repetitive of the foregoing sequence of shift phases.

It should be pointed out that although an input to the register was described as occurring at the core structure $10_1$ and an output signal taken at the core structure $10_n$, either of these functions may be accomplished at any stage of the register. Thus, both parallel input and parallel read-out are possible in a register according to this invention. Because of the gain provided by the turns ratio of the output windings 17 and the input windings 18 of the coupling hoops, each core can be used to drive a number of other core structures 10 in addition to the core structure 10 of the next succeeding stage. Thus utilization circuits coupled to each of the cores for parallel read-out may each advantageously contain a number of cores. An input at any point is timed to occur during an $a_2$ advance phase and the input information is introduced at any core structure 10 in a "clear" magnetic state to avoid interference with the sequence of information already in the register. An output signal may readily be obtained from any selected leg of a core structure. Any flux switching in such a leg may then be detected by a coupled output winding and will be indicative of a binary "1," either as a "primed" flux pattern redistribution or as a straight "1" flux pattern shift.

The illustratitve shift register of FIG. 1 may be modified by the addition of biasing windings and a biasing current source to reduce the magnitude of the $a_1$ and $a_2$ phase advance currents. Such a modification is depicted in FIG. 3, where only the core structures $10_1$, $10_2$, and $10_3$ of the register of FIG. 1 are shown. A biasing winding 50 is inductively coupled to any portion of a structure 10 serving as a common flux path for the two flux units $\Phi_1$ and $\Phi_2$. The input leg 13 of each of the core structures 10 is convenient for this purpose. The windings 50 are serially connected in a biasing circuit 51 which circuit 51 includes ground at one end and a source of biasing current 52 at the other end. The bias current source 52 is energized coincidentally with the energization of each of the pulse sources 26 and 27 in the $a_1$ and $a_2$ advance phases, respectively. The current thus applied from the bias source 52 is of a polarity and magnitude to bias the flux of the input legs 13 just to the threshold of switching. As a result, when a flux pattern representative of a binary "1" is to be introduced into a core structure 10 during an $a_1$ or $a_2$ advance phase, the current required in the coupling loop 16 to effect this flux change will be substantially reduced. The required magnitude of either the $a_1$ or $a_2$ advance phase currents will in turn also be advantageously reduced. In the same manner, similar bias windings could be added to the flux-switching legs and energized during the priming phase $p$ to reduce the priming current magnitudes required or to increase the maximum $p$ current permissible.

Figure 4:
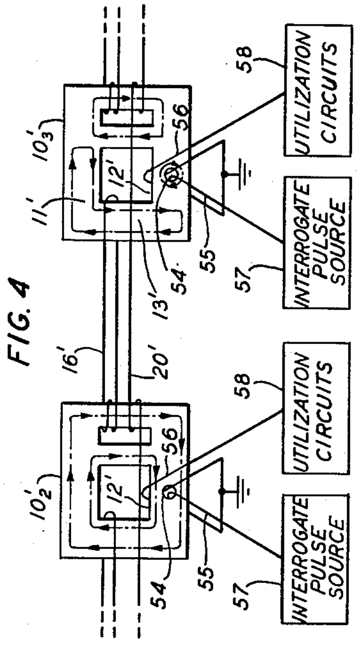
FIG. 4 is a partial schematic diagram of another modification of the shift register of FIG. 1, adapted for nondestructive parallel read out.

The adaptation of the basic core structure 10 as employed in the specific shift register arrangement of FIG. 1 for parallel read out will be appreciated from the foregoing description. Such a parallel and, advantageously, individual read out may be accomplished nondestructively and a modification of the basic core structure 10 for accomplishing such a read out is depicted in FIG. 4. The modified core structures $10_2'$ and $10_3'$ may be substituted for the elements $10_2$ and $10_3$ of the register of FIG. 1 and have been selected for description purposes since both a "clear" or "0" read out and a "1" read out may thus be demonstrated. Each of the core structures 10' is provided with a small aperture 54 which may conveniently be disposed between the two flux unit paths in one of the side-rails. The side-rail 12' is used for this purpose in the embodiment being described. Threading each of the apertures 54 is an interrogate winding 55 and a read-out winding 56. One end of each of these windings is connected to ground, the other end of each of the interrogate windings 55 being connected to a source of interrogate current pulses 57 and the other end of each of the read-out windings 56 being connected to parallel information utilization circuits 58.

The flux patterns in each of the core structures $10_2'$ and $10_3'$ are represented by the broken lines with the flux directions being indicated by the arrows in FIG. 4. Thus, as was the case in the corresponding cores of the register of FIG. 1, the core structure $10_2'$ is in a "clear" flux state and the core structure $10_3'$ has contained therein a binary "1." In the former case single flux units $\Phi$ are shown as passing on either side of the apertures 54 in accordance with flux closures of a "clear" flux pattern. An interrogating current pulse may be applied from a pulse source 57 at any time which will not interfere with the redistribution of flux patterns during a shift cycle. Thus, from what follows, it will be clear that any flux switching in a core structure 10' which does not affect the flux state in an input leg will permit a simultaneous parallel read out. A positive interrogating pulse applied from a source 57 to the winding 55 of the core structure $10_2'$ is of a magnitude insufficient to cause a flux switching in the flux paths defined by the major legs of the structure. However, the latter current pulse may cause such a switch of flux about the aperture 54. In the case of the core structure $10_2'$, however, such a flux switch cannot occur since the available flux paths on either side of its aperture 54 are remanently flux saturated by the over-riding flux of the "clear" or "0" pattern. Accordingly, the interrogation of core structure $10_2'$ at this time fails to cause a flux change about the aperture 54 and no output signal is induced in the coupled read-out winding 56. This conduction may be detected by the utilization circuit 58 as representative of the "clear" state or of a binary "0" stored in the core structure $10_2'$ in the conventional manner.

The parallel read-out of a binary "1" may be described with reference to the core structure $10_3'$ of FIG. 4. In that case it will be noted that the side-rails 11' and 12' and input leg 13' are magnetically neutral, or as such a magnetic state may be symbolized, single flux units $\Phi$ are closed within these members. As a result, when an interrogating current pulse is now applied to the coupled winding 55 from a source 57, a complete flux switching may occur about the aperture 54 in the magnetically neutral side-rail 12' of the core structure $10_3'$. This flux switching is indicated by the broken line 59 about the aperture 54 in FIG. 4. The magnitude of the interrogating current pulse is again insufficient to cause a switching about the longer flux paths defined by the major legs. As a result of the flux change about the aperture 54, a read-out signal will be induced in the coupled read-out winding 56 which signal will be transmitted to a utilization circuit 58 as indicative of the presence in the core structure $10_3'$ of a binary "1." It will be appreciated that in the embodiment being described, the latter read-out signal could as well have been indicative of a "primed 1." However, ambiguity is precluded since both are representative at different operative phases of the register of the binary "1" value. In both of the foregoing parallel read-out operations described, it is to be noted that in each case the basic flux patterns representative of information states were left undisturbed.

What have been described are considered to be only illustrative embodiments of the present invention. Accordingly, it is to be understood that other and numerous arrangements may be devised by one skilled in the art without departing from the spirit and scope of this invention.

What is claimed is:

1. An electrical control circuit comprising a plurality of multi-apertured magnetic core structures, each of said structures having substantially rectangular hysteresis characterestics and each having an input leg, an output leg, an intermediate leg, and means for completing a first flux path through said input and intermediate legs and a second flux path through said input and output legs; a plurality of coupling circuits for coupling only said output leg of each of said core structures with said input legs of respective succeeding core structures, a priming winding and a first and second advance winding for each of said core structures, said priming winding and said first advance winding being coupled to said output leg and said second advance winding being coupled to said input leg of a core structure, a first shift circuit means including a first pulse source for connecting each of said priming windings in series, a second shift circuit means including a second pulse source for connecting the first advance windings of first alternate core structures and the second advance windings of second alternate core structures in series, and a third shift circuit means including a third pulse source for connecting the first advance windings of said second alternate core structures and the second advance windings of said first alternate core structures in series.

2. An electrical control circuit according to claim 1 in which the input leg of each of said structures has a minimum cross-sectional area substantially equal to the sum of the minimum cross-sectional areas of said intermediate and output legs.

3. An electrical control circuit according to claim 2 in which said priming windings are in a sense opposite to the sense of said first advance windings.

4. An electrical control circuit comprising a plurality of multi-apertured magnetic structures of a material having substantially rectangular hysteresis characteristics, an input and a first advance winding in one of said apertures of each of said structures, an output, a priming, and a second advance winding in a second of said apertures of each of said structures, a plurality of coupling circuits each including one of said input windings and one of said output windings for coupling said plurality of structures in an ordered sequence, means including a first pulse source for applying a first shift pulse to said priming windings in series, means including a second pulse source for applying a second shift pulse to alternating first ones of said first and second advance windings in series, and means including a third pulse source for applying a third shift pulse to alternating second ones of said first and second advance windings in series.

5. An electrical control circuit according to claim 4 also comprising a source of information input pulses connected to the input windings of the first structure of said sequence and information read-out circuit means connected to the output winding of the last structure of said sequence.

6. An electrical control circuit according to claim 5 in each of said coupling circuits includes only said input and said output windings.

7. A shift register circuit comprising a plurality of magnetic elements each comprising an input leg, an output leg, an intermediate leg, and means for completing flux paths through said output and intermediate leg and said input leg, each of said legs being of a material having substantially rectangular hysteresis characteristics; an input winding and a first advance winding on each of said input legs, an output winding, a priming winding, and a second advance winding on each of said output legs, a plurality of coupling circuits each comprising exclusively one of said input windings and one of said output windings, a first shift circuit for connecting each of said priming windings in series, a second shift circuit for connecting the first advance windings of first alternate elements and the second advance windings of second alternate elements in series, and a third shift circuit for connecting the first advance windings of said second alternate elements and the second advance windings of said first alternate elements in series.

8. A shift register circuit according to claim 7 also comprising a bias winding on each of said input legs and a biasing circuit for connecting each of said bias windings in series.

9. A shift register circuit comprising a plurality of magnetic flux control structures capable of assuming stable remanent states, each of said structures having an input leg, an output leg, an intermediate leg, and means for completing a first flux path through said input and intermediate legs and a second flux path through said input and output legs, an input and a first advance winding being coupled to said input leg, an output, a priming, and a second advance winding being coupled to said output leg; a plurality of bi-directional current circuit means, each including one of said output windings and one of said input windings, first advance circuit means including a pulse source for applying a first advance pulse to the first advance windings of alternating first structures and to the second advance windings of alternating second structures, second advance circuit means including a pulse source for subsequently applying a second advance pulse to the first advance windings of said alternating second structures and to the second advance windings of said alternating first structures, and a priming circuit means including a pulse source for applying a priming pulse to each of said priming windings alternately with said first and said second advance pulses.

10. A shift register circuit according to claim 9 in which each of said flux control structures also comprises a bias winding on said input leg and a biasing circuit means including a current source for applying a biasing current to each of said bias windings coincidentally with each of said first and said second advance pulses.

11. A shift register circuit according to claim 9 in which particular ones of said flux control structures have an aperture in said input leg and an interrogate winding and a read-out winding in said aperture.

12. A shift register circuit according to claim 9 in which particular ones of said structures have a read-out winding on said output leg.

13. A shift register circuit according to claim 9 in which the input leg of each of said structures has a minimum cross-sectional area substantially equal to the sum of the minimum cross-sectional areas of said intermediate and output legs.

References Cited in the file of this patent

UNITED STATES PATENTS

| | | |
|---|---|---|
| 2,803,812 | Rajchman | Aug. 20, 1957 |
| 2,911,628 | Briggs | Nov. 3, 1959 |